United States Patent [19]

Yoneda et al.

[11] Patent Number: 4,733,343
[45] Date of Patent: Mar. 22, 1988

[54] MACHINE TOOL NUMERICAL CONTROLLER WITH A TROUBLE STOP FUNCTION

[75] Inventors: Takao Yoneda, Toyoake; Yasuji Sakakibara, Hekinan, both of Japan

[73] Assignee: Toyoda Koki Kabushiki Kaisha, Kariya, Japan

[21] Appl. No.: 828,650

[22] Filed: Feb. 12, 1986

[30] Foreign Application Priority Data

Feb. 18, 1985 [JP] Japan .................................. 60-31218

[51] Int. Cl.$^4$ .............................................. G05B 9/02
[52] U.S. Cl. .................................. 364/184; 364/183; 364/185; 340/680; 318/565
[58] Field of Search ............... 364/167, 183, 184, 185; 340/680; 318/565

[56] References Cited

U.S. PATENT DOCUMENTS 3,834,615  9/1974  Watanabe et al. ............. 364/185 X
3,836,834  9/1974  Abbatiello et al. ............ 364/184 X
4,263,647  4/1981  Merrell et al. ................. 364/171 X
4,480,303  11/1984 Takada et al. .................. 364/184 X
4,516,211  5/1985  Nozawa et al. ..................... 364/474

Primary Examiner—Jerry Smith
Assistant Examiner—Steve L. Hoang
Attorney, Agent, or Firm—Oblon, Fisher, Spivak, McClelland & Maier

[57] ABSTRACT

A numerical controller for a grinding machine composed of a central processing unit (CPU), which is programmed to read out a numerical control program block by block from a memory device and to control a pulse generation circuit to generate pulses of such number and frequency as determined by the read-out data block, for supply to feed servomechanisms of the grinding machine. The CPU is also programmed to execute a trouble identification routine and a trouble processing routine at predetermined time intervals. The trouble identification routine enables the CPU to identify the kinds of troubles occurring in the grinding machine and to assort the troubles into a number of trouble modes. The trouble processing routine enables the CPU to operate so that a movable member of the grinding machine is immediately stopped or, for preventing the actual position of the movable member from differing from a present position thereof stored in the memory device, slowly stopped depending upon the kind of a trouble presently occurring in the grinding machine.

6 Claims, 8 Drawing Figures

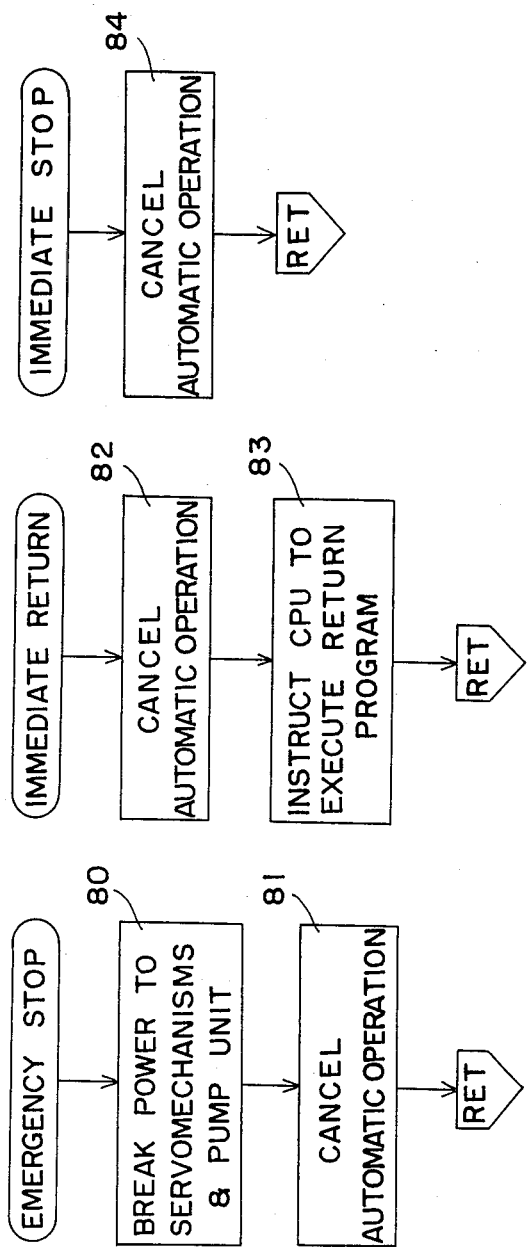

MACHINE TOOL NUMERICAL CONTROLLER WITH A TROUBLE STOP FUNCTION

BACKGROUND OF THE INVENTION

1. Field of the Invention

The present invention relates to a numerical controller capable of discontinuing the feed movement of a movable member of a machine tool upon the occurrence of an abnormality or trouble.

2. Discussion of the Prior Art

Generally, in numerical control machine tools, an emergency stop is performed upon detection of an abnormality or a trouble for preventing such a trouble during the automatic operation from resulting in an accident. That is, controllers for the numerical control machine tools check for the occurrences of troubles or abnormalities such as occur on drive units for driving servomotors, excessive movements of movable members beyond designed moving strokes and the like and upon detection of any of such troubles, execute an emergency stop in such a manner as to cancel the automatic operation and to break electric power to the drive units and the servomotors.

However, in the known machine tools, the emergency stop is performed not only upon the occurrence of a serious trouble leading to uncontrolled runs of the movable members, but also upon the occurrence of a minor trouble such as a voltage drop on a battery for a random access memory storing numerical control programs. This undesirably makes it difficult or time consuming to resume a discontinued machining operation after removal of any cause of the trouble, for the reasons mentioned below.

Although the distribution of pulses to feed servomechanisms is immediately stopped by the execution of an emergency stop, the feed servomechanisms and movable members of a machine tool driven thereby continue their movements due to their inertias thereafter. This makes a difference between the actual position of each movable member and the present position which is stored in the controller for use in numerical control operations. Therefore, after removal of any cause of the trouble, the operator has to do such troublesome procedures as to return the movable members to their original positions in a manual operation mode and to initialize or reset present position registers in the controller, for subsequent resumption of the automatic machining operation.

SUMMARY OF THE INVENTION

Accordingly, it is a primary object of the present invention to provide an improved control apparatus for a numerical control machine tool which is capable of stopping, upon the occurrence of a trouble, a movable member of the machine tool in such a manner as to make it easy to resume a machining operation after the removal of any cause of the trouble.

Another object of the present invention is to provide an improved control apparatus of the character set forth above which is capable of discriminating a serious trouble from other unserious troubles so that an emergency stop is executed only upon occurrence of the serious trouble.

A further object of the present invention is to provide an improved control apparatus of the character set forth above wherein a plurality of troubles are assorted into a fewer number of trouble modes, thereby making it possible to execute a number of processings respectively suitable to the trouble modes.

An additional object of the present invention is the provision of an improved control apparatus of the character set forth above which is capable of inhibiting the read-out of a numerical control data block which is successive to another numerical control data block being presently executed, for making the subsequent resumption of a machining operation easy.

Briefly, according to the present invention, there is provided a control apparatus for a numerical control machine tool, which apparatus comprises first and second stop control devices, a trouble identification device and a trouble processing device. The identification device identifies the kinds of troubles occurring in the machine tool. The trouble processing device selectively operates the first and second stop control devices depending upon the kinds of a trouble identified by the identification device. When operated, the first stop control device immediately discontinues the movement of a movable member of the machine tool, while the second stop control device stops the movable member through the execution of a slow-down feed so as to prevent the actual position of the movable member from differing from a present position stored in the control apparatus.

With this configuration, when the movable member is stopped by the operation of the second stop control device, data which is stored in the control apparatus to indicate the present position of each movable member is maintained in coincidence with the actual position of the movable member. Accordingly, it becomes easy to resume a machining operation after the removal of any cause of the trouble, because there are no longer required troublesome procedures such as the returning of movable members to their original positions, the resettings of registers for storing present positions of the movable members and the like.

BRIEF DESCRIPTION OF THE ACCOMPANYING DRAWINGS

Various other objects, features and many of the attendant advantages of the present invention will be readily appreciated as the same becomes better understood by reference to the following detailed description of a preferred embodiment when considered in connection with the accompanying drawings, wherein like reference numerals designate identical or corresponding parts throughout the several views, and in which:

FIG. 6 is a flow chart of an emergency stop processing executed by a programmable sequence controller shown in FIG. 1;

FIG. 7 is a flow chart of an immediate return processing executed by the programmable sequence controller; and FIG. 8 is a flow chart of an immediate stop processing executed by the programmable sequence controller.

DETAILED DESCRIPTION OF THE PREFERRED EMBODIMENT

Figure 1:
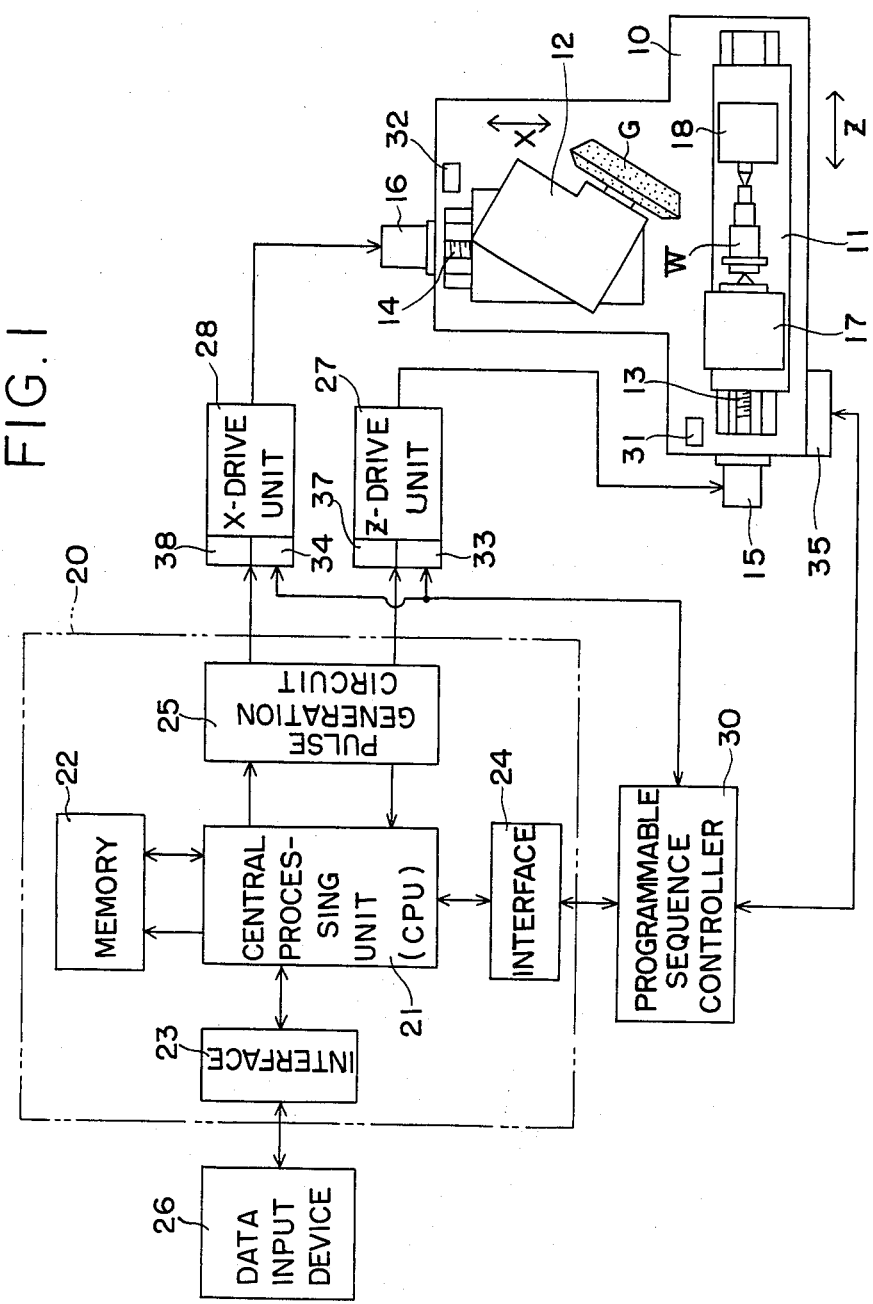
FIG. 1 is a block diagram of a machine control apparatus according to the present invention, also showing a schematic plan view of a grinding machine.

Referring now to the drawings and particularly to FIG. 1 thereof, a numerical control machine tool to which the present invention is applied is shown as a numerical control grinding machine having a bed 10, on which a work table 11 and a wheel head 12 are guided for sliding movements in Z and X-axis directions perpendicular to each other and are drivingly connected to servomotors 15, 16 through feed screws 13, 14, respectively. The work table 11 carries thereon a work head 17 and a foot stock 18 for rotatably carrying opposite ends of a workpiece W to be ground. Movements of the work table 11 and the wheel head 12 are given by controlling command pulses supplied from a numerical controller 20 to the servomotors 15, 16, so that the workpiece W can be ground to have a desired shape and dimension.

The numerical controller 20 for controlling movements of the work table 11 and the wheel head 12 is computerized and is composed of a central processing unit (hereafter referred to as "CPU") 21, a memory 22, interfaces 23, 24, and a pulse generation circuit 25. The interface 23 is connected to a data input device 26, while the interface 24 is connected to a programmable sequence controller 30. The pulse generation circuit 25 is connected to drive units 27 and 28 for respectively driving the servomotors 15, 16.

Figure 2:
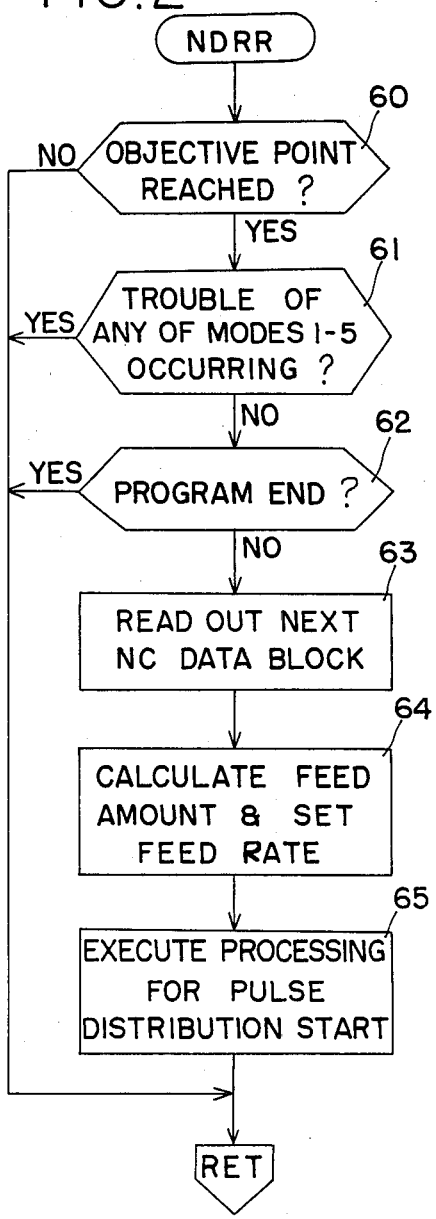
FIG. 2 is a flow chart of a numerical control data read-out routine executed by a central processing unit shown in FIG. 1.
Figure 3:
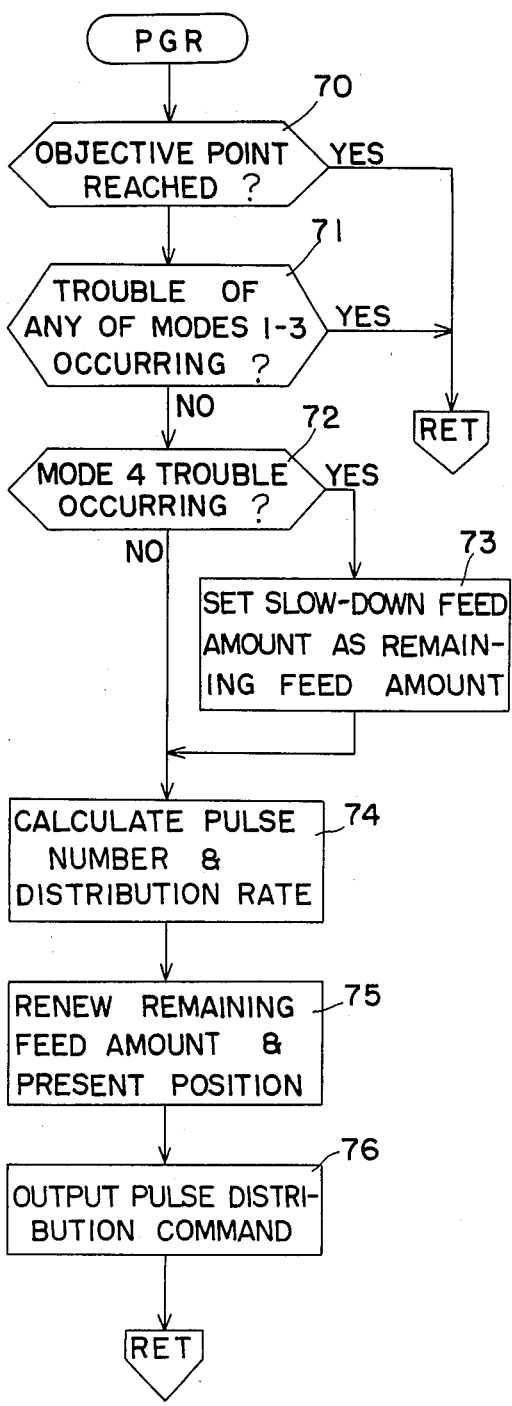
FIG. 3 is a flow chart of a pulse distribution routine executed by the central processing unit.

The memory 22 stores, in addition to a numerical control (NC) program, a number of system control programs which include a base routine (not shown), an NC data read-out routine NDRR shown in FIG. 2 and a pulse distribution routine PGR shown in FIG. 3 for performing a pulse distribution function and the like in accordance with the numerical control program so as to effect feed control of the grinding machine. The read-out routine NDRR is executed in response to an interruption signal which is generated at a predetermined time interval for enabling the CPU 21 to read out the NC program block by block and to calculate feed amounts based upon each read-out NC data block. The distribution routine PGR enables the CPU 21 to calculate the number of pulses which are to be generated within a unit time period and a distribution rate at which the number of pulses are to be distributed, based upon the calculated feed amounts and the calculated feed rate and then, to set the number of pulses and the distribution rate in the pulse generation circuit 25, so that the same performs a pulse distribution operation in a condition so determined. The routine PGR is repeatedly executed by the CPU 21 each time the same receives a distribution completion signal from the pulse generation circuit 25.

The above-noted base routine causes the CPU 21 to execute the NC data read-out routine NDRR when a machining start command is given or when either the work table 11 or the wheel head 12 reaches an objective point thereof as designated by a previously read-out NC data block. With the starting of the routine NDRR, step 60 is executed to ascertain whether or not an objective point has been reached. The occurrence of any trouble which is classified into trouble modes 1–5 as described later in detail is ascertained in step 61. Unless such any trouble has occurred and the NC program end is ascertained in step 62, step 63 is reached wherein an initial or successive NC data block is read out from the memory 22. If any such trouble has occurred or the NC program end is ascertained, on the other hand, return is made to the base routine to prevent a successive NC data block from being read out. Feed amount data and feed rate data designated by the read-out NC data block are set in registers (not shown) defined in a parameter storage area of the memory 22 in step 64, and processing is executed in step 65 to trigger the subsequent execution of the pulse distribution routine PGR before returning to the base routine.

As a result, the base routine then directs the CPU 21 to execute the pulse distribution routine PGR. In this case, since it is ascertained in step 70 that an objective point designated by the read-out NC data block has not been reached yet, the CPU 20 advances its processing through steps 71 and 72 described later in detail to step 74, wherein the number of pulses to be distributed within a unit time period and the pulse distribution rate are calculated to be set in the pulse generation circuit 25. Step 75 is then executed to renew the remaining feed amount to the objective point and present positions of the work table 11 and the wheel head 12. A pulse distribution command is then given to the pulse generation circuit 25 in step 76 before return is made to the base routine. Consequently, the circuit 25 distributes feed pulses to one or both of the drive units 27, 28 at the feed rate or frequency set therein, whereby the work table 11 and the wheel head 12 are relatively moved.

When completing the distribution of pulses of the number designated by the CPU 21, the pulse generation circuit 25 issues a pulse distribution completion signal, in response to which the CPU 20 executes the pulse distribution routine 70 again. This causes the pulse generation circuit 25 to distribute pulses for another unit time period. The routine PGR is repeatedly executed in this manner, and when it is ascertained in step 70 that the objective point has been reached, the CPU 21 returns to the base routine to execute then the routine NDRR for a successive NC data block.

Figure 4:
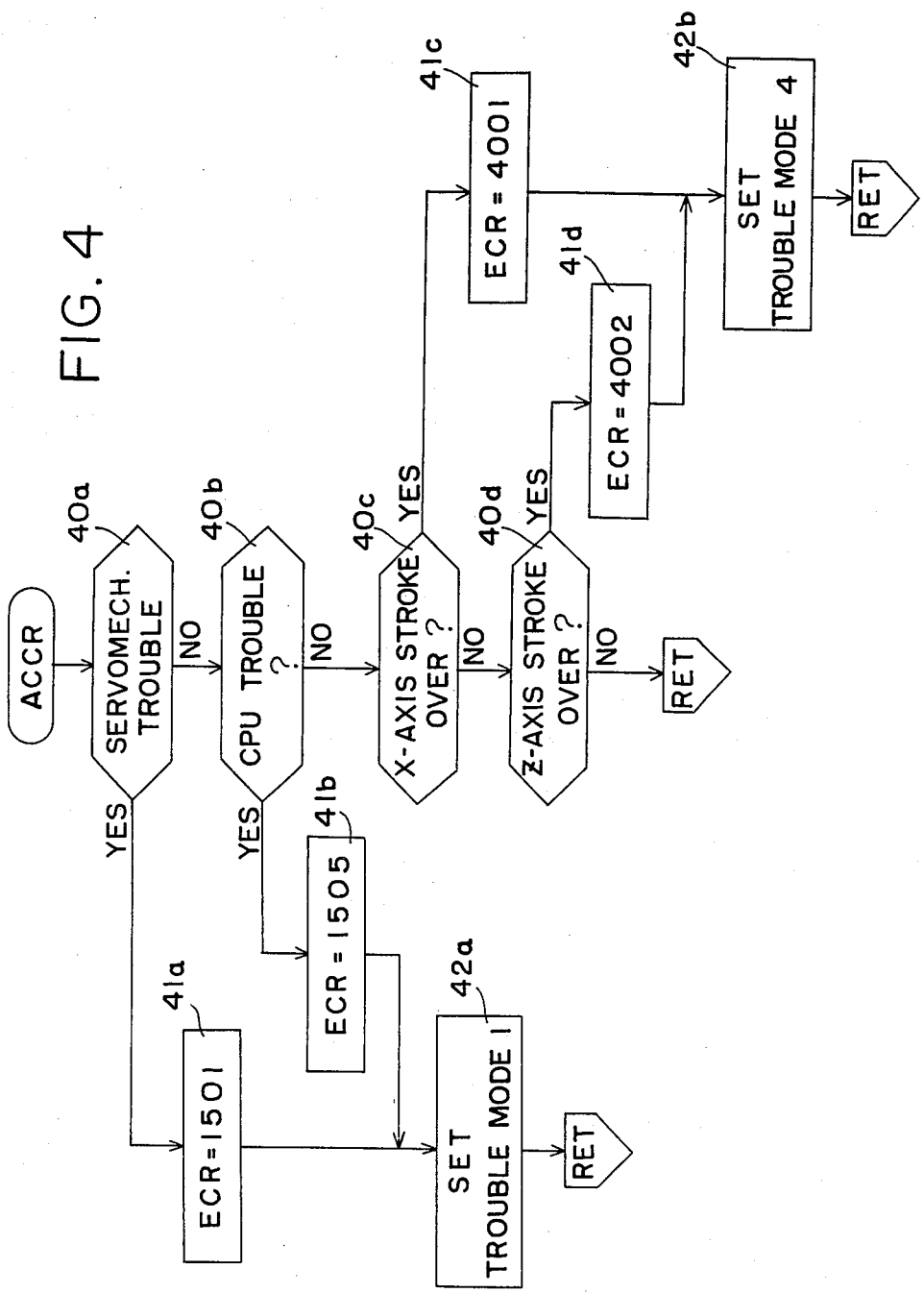
FIG. 4 is a flow chart of a trouble identification routine executed by the central processing unit.
Figure 5:
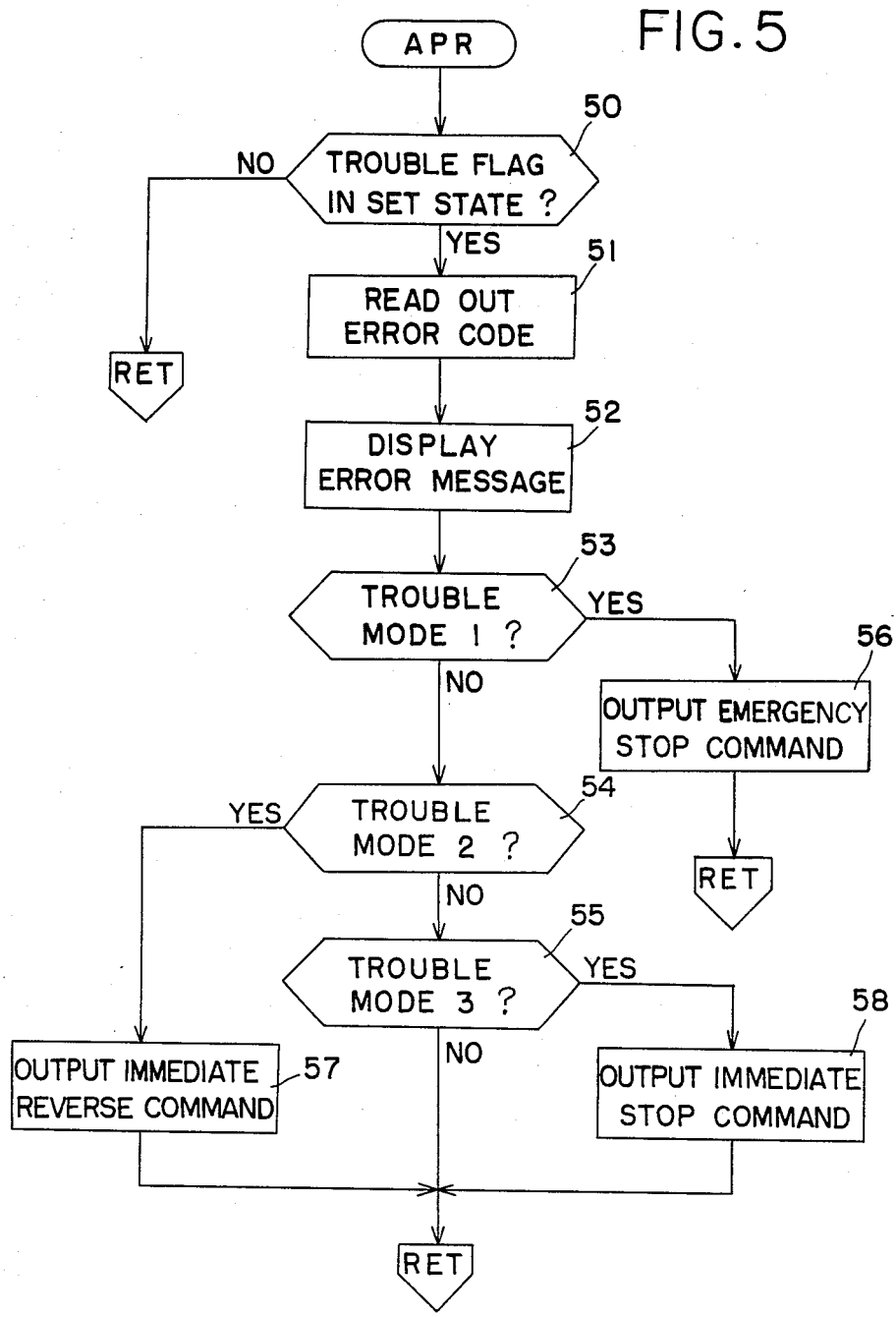
FIG. 5 is a flow chart of a trouble processing routine executed by the central processing unit.

The memory 22 further stores therein a trouble identification program or routine ACCR shown in FIG. 4 and a trouble processing program or routine APR shown in FIG. 5. The CPU 21 identifies and processes several kinds of troubles in accordances with these routines.

The sequence controller 30 is responsive to a number of trouble processing commands applied from the numerical controller 20. Sequence programs shown in FIGS. 6–8 are stored in a program memory (not shown) of the sequence controller 30 for enabling the same to process different kinds of troubles selectively.

Description will be made hereafter with respect to the trouble identification and processing operations performed by the CPU 21 and the sequence controller 30. Occurrences of troubles in the automatic operation are checked at a predetermined time interval in accordance with the trouble identification routine ACCR. For detections of such troubles, as shown in FIG. 1, the grinding machine is provided with sensors 31, 32 (e.g., limit switches) which are responsive to excessive movements or overruns of the work table 11 and the wheel head 12, and the drive units 27, 28 incorporate therein sensors 33, 34 for detecting overloads on the servomotors 15, 16. Signals from the sensors 31, 32 are input to the sequence controller 30 by way of a terminal box 35 of the grinding machine, and signals from the sensors 33, 34 are also input to the sequence controller 30. Thus, the CPU 22 is enabled to detect any of the above-noted troubles in response to an interruption from the sequence controller 30. Further, the sequence controller 30 is programmed to apply, in response to various output signals or data from the CPU 20, various machine control signals to the terminal box 35 and commands to circuit breakers 37, 38 incorporated in the drive units 27, 28, as will be described later.

With the starting of the routine ACCR shown in FIG. 4, the occurrences of troubles on the feed servo-mechanisms (i.e., the drive units 27, 28 and the servomotors 15, 16), the CPU 21, axis overrun, etc. are selectively detected in any of steps 40a–40d, and an error code which is assigned to the kind of any detected trouble is set in an error code register (not shown) provided in the memory 22 in steps 41a–41d. In step 42a following steps 41a and 41b and in step 42b following steps 41c and 41d, an error mode register (not shown) formed in the memory 22 is set with trouble mode information which represents a particular processing to be performed upon occurrence of a trouble.

TABLE 1

| MODE 1 | Trouble needing emergency stop of whole system |
| MODE 2 | Trouble needing reverse feed subsequent to immediate feed stop |
| MODE 3 | Trouble needing immediate feed stop |
| MODE 4 | Trouble needing slow-down feed prior to feed stop |
| MODE 5 | Trouble needing feed stop right before execution of successive NC data block |
| MODE 6 | Trouble needing display of trouble |

The trouble modes used in this particular embodiment includes MODES 1–6, as noted in the above TABLE 1. Of these modes, MODES 1–3 represent troubles which need the immediate stop of any feed movement, MODES 4 and 5 represent troubles which need a slow-down feed prior to a feed stop, and MODE 6 represents a trouble which only needs the display of the trouble.

The trouble processing routine APR shown in FIG. 5 is executed at a predetermined time interval. The CPU 21 executes step 51 and those successive thereto when ascertaining in step 50 that trouble mode information has been set in the error code register ECR. That is, processings in steps 51 and 52 are executed to read out an error code, e.g., 1501, 1505, 4001 or 4002 as seen in FIG. 4, from the error code register ECR and then, to display it on a display screen (not shown) of the data input device 26. It is ascertained in steps 53–55 whether the trouble occurring is of any of MODES 1–3. If the trouble occurring is of MODE 1, a command for emergency stop of the whole system is output to the sequence controller 30 in step 56. If it is of MODE 2, a command for an immediate reverse feed is applied to the sequence controller 30 in step 57. Further, if it is of MODE 3, step 58 is reached to deliver a command for immediate feed stop to the sequence controller 30.

Further, if the trouble occurring is of any of MODES 1–3, such is detected in step 71 of the pulse distribution routine PGR shown in FIG. 3, and this causes the processings in steps 74–76 for pulse distribution to be bypassed. Consequently, when any trouble of MODES 1–3 occurs, the pulse distribution operation is immediately terminated without executing a slow-down feed processing.

On the other hand, the sequence controller 30, when given the emergency stop command, executes the processings shown in FIG. 6, wherein an automatic operation mode is cancelled in step 81 after step 80 in which is executed the break of electric power to the feed servomechanism as well as to a pump unit (not shown) constituting a hydraulic control system of the grinding machine. Further, the sequence controller 30, when given the immediate return command, cancels the automatic operation mode in step 82 of FIG. 7 and then, instructs in step 83 the CPU 21 to execute a program (not shown) that is stored in the memory 22 of the numerical controller 20 for reverse feed of a predetermined amount. Further, as shown in FIG. 8, the sequence controller 30 in step 84 cancels the automatic operation mode in response to the immediate feed stop command given thereto.

With the numerical controller 20 and the sequence controller 30 operated in the above-described manner, the occurrence of the MODE 1 trouble results in the immediate stop of pulse distribution, the break of electric power to the drive units 27, 28 as well as to the pump unit, and the cancellation of the automatic operation mode. The occurrence of the MODE 2 trouble results not only in the immediate stop of the pulse distribution followed by the cancellation of the automatic operation mode, but also in the execution by the numerical controller 20 of the reverse feed program, whereby the wheel head 12 is reversely moved a predetermined amount. Troubles which directly concern the movement of the wheel head 12 are treated as the MODE 2 trouble. Therefore, when the MODE 2 trouble occurs during the machining of the workpiece W, the wheel head 12 is stopped, with any stress of the workpiece W being removed and with the grinding wheel G being away from the workpiece W, thereby ensuring safety. Further, the occurrence of the MODE 3 trouble results in the immediate stop of the pulse distribution followed by the cancellation of the automatic operation mode.

However, when a trouble occurring is of MODES 4–6, no command is applied to the sequence controller 30, as understood from FIG. 5, and a processing against the trouble is carried out only at the side of the numerical controller 20. More specifically, the occurrence of the MODE 4 trouble is detected in step 72 of the pulse distribution routine PGR shown in FIG. 3, and a processing is executed in step 73 to set a predetermined slow-down feed amount as the remaining feed amount. Accordingly, a slow-down feed processing is executed in step 74, whereby the feed rate of the movable member (table 11 or wheel head 12) is gradually decreased to stop the movable member when the remaining feed amount is reduced to zero. Upon the remaining feed amount becoming zero, the CPU 21 of the numerical controller 20 judges in step 70 that the movable member has reached an objective point. This permits the CPU 21 subsequently to execute the NC data read-out routine NDRR, whereby the occurrence of the MODE 4 trouble is ascertained in step 61 to direct the CPU 21 for the base routine. Since steps 62–65 are thus bypassed, no successive NC data block is read out. Consequently, the processings of the CPU 21 according to the NC program are discontinued upon completion of the slow-down feed.

In the case of the MODE 5 trouble, the pulse distribution presently executed is continued, and the occurrence of the trouble is detected when the processing in step 61 of the NC data read-out routine NDRR is executed, to prevent the read-out of a successive NC data block so as to thereby maintain the stopped status. That is, the occurrence of the MODE 5 trouble permits feed control to be continued until the pulse distribution according to the NC data block presently executed is completed, whereby the feed control of a movable member is discontinued upon completion of a slow-down feed.

As described above, at the occurrence of any of the MODE 4 and 5 troubles, the feed control of the movable member is discontinued after a slow-down feed. Accordingly, when the machining is resumed after the removal of any cause of the trouble, it is unnecessary to return the movable members (table 11 and the wheel head 12) to original positions thereof, thereby reducing manipulations necessary for resumption of the machining operation.

Obviously, numerous modifications and variations of the present invention are possible in light of the above teachings. It is therefore to be understood that within the scope of the appended claims, the present invention may be practiced otherwise than as specifically described herein.

What is claimed is:

1. In a machine control apparatus for controlling the movement of a movable member of a machine tool in accordance with a numerical control program, the improvement comprising:

first stop control means for immediately stopping said movable member;

second stop control means for stopping said movable member through the execution of a slow-down feed so as to prevent the actual position of said movable member from differing from a present position stored in said machine control apparatus;

trouble identification means for identifying the kind of a trouble occurring in said machine tool; and trouble processing means for selectively operating said first and second stop control means depending upon the kind of the trouble identified by said trouble identification means, when said movable member is being moved in accordance with one data block of said numerical control program.

2. A machine control apparatus capable of controlling the movement of a movable member of a machine tool in accordance with a numerical control program, said apparatus comprising:

memory means for storing a numerical control program composed of a plurality of NC data blocks;

read-out means for reading out said NC data blocks from said memory means block by block;

pulse distribution means responsive to said NC data block read out by said read-out means for distributing feed pulses to a feed mechanism for said movable member in accordance with said read-out NC data block;

trouble identification means for identifying a plurality of troubles occurring in said machine tool so as to selectively generate trouble mode signals including first and second trouble mode signals depending upon the kind of one of said troubles identified by said trouble identification means;

first stop control means responsive to said first trouble mode signal from said trouble identification means for causing said feed mechanism to immediately discontinue its feed operation; and second stop control means responsive to said second trouble mode signal from said trouble identification means for causing said feed mechanism to immediately effect a slow-down feed and to discontinue its operation upon completion of said slow-down feed.

3. A machine control apparatus as set forth in claim 2, wherein:

said first stop control means comprises means responsive to said first trouble mode signal for immediately discontinuing the operation of said pulse distribution means before said movable member reaches an objective position designated by said read-out NC data block; and said second stop control means comprises means responsive to said second trouble mode signal for enabling said pulse distribution means to perform a slow-down feed operation so that said movable member is slowly stopped before reaching an objective position designated by said read-out NC data block.

4. A machine control apparatus as set forth in claim 3, wherein said trouble identification means selectively generates said first and second trouble mode signals and a third trouble mode signal depending upon the kind of the trouble identified by said trouble identification means, further comprising:

emergency stop processing means responsive to said third trouble mode signal from said trouble identification means for immediately breaking electric power supplied to said feed servomechanism for said movable member.

5. A machine control apparatus as set forth in claim 2, further comprising:

read-out inhibition means responsive to any of said first and second trouble mode signals from said trouble identification means for inhibiting the operation of said read-out means so as to prevent a successive NC data block from being read out from said memory means.

6. A machine control apparatus as set forth in claim 2, wherein said trouble identification means comprises:

encoding means for generating a plurality of coded data which are respectively assigned to plural kinds of troubles occurring in said machine tool; and assorting means for identifying said coded data as corresponding to predetermined of said trouble mode signals including said first and second trouble mode signals.

* * * * *